(No Model.)

N. H. NEWTON.
COTTON CHOPPER.

No. 534,123. Patented Feb. 12, 1895.

WITNESSES:
Chas. Nigra.
Fred Acker

INVENTOR
N. H. Newton
BY
Munn & Co.
ATTORNEYS.

UNITED STATES PATENT OFFICE.

NICHOLAS H. NEWTON, OF RUSK, TEXAS.

COTTON-CHOPPER.

SPECIFICATION forming part of Letters Patent No. 534,123, dated February 12, 1895.

Application filed November 17, 1894. Serial No. 529,143. (No model.)

*To all whom it may concern:*

Be it known that I, NICHOLAS H. NEWTON, of Rusk, in the county of Cherokee and State of Texas, have invented a new and Improved Cotton-Chopper, of which the following is a full, clear, and exact description.

My invention relates to an agricultural implement, and especially to an improvement in a machine for chopping cotton, and it has for its object to provide such a machine which will cultivate the rows of plants simultaneously with thinning them out; and a further object of the invention is to provide such a machine which will be durable and simple.

The invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in all the views.

Figure 1:
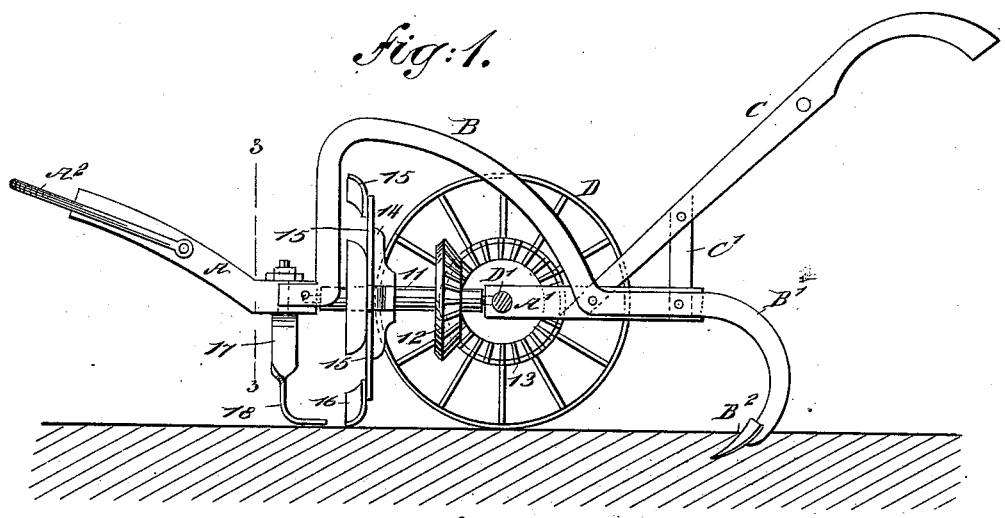
Figure 2:
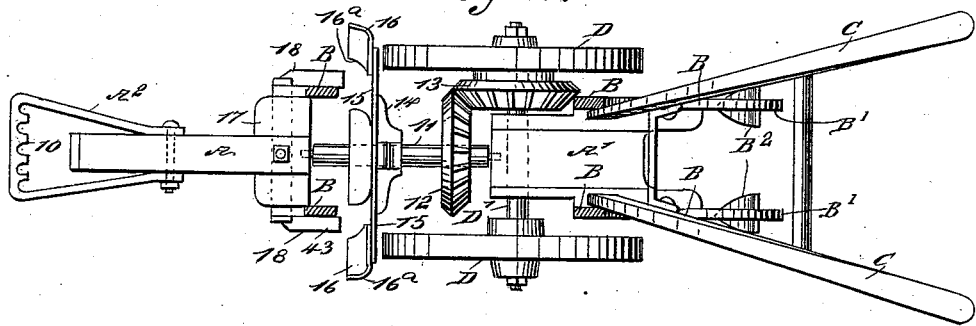
Figure 3:
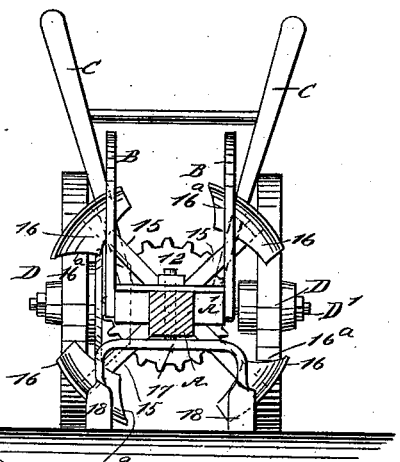

Figure 1 is a side elevation of the machine. Fig. 2 is a plan view, a portion of the frame being in horizontal section; and Fig. 3 is a vertical section taken practically on the line 3—3 of Fig. 1.

In carrying out the invention the frame of the machine consists of a beam constructed in two sections A and A', which sections are separated a predetermined distance and are connected by side irons or arms B, which arms are preferably secured one to each side of the rear portion of the forward section A of the main beam, and are then carried vertically upward and arched downwardly and rearwardly to a connection with the rear portion of the rear beam section A'; and the rear parts of the irons or side connecting bars B follow the sides of the rear beam section A', and are curved downwardly and forwardly from the rear of the said rear beam section, forming shanks B', to which plow blades B² of any approved construction are attached, preferably in an adjustable manner.

The frame is supported by two wheels D, which wheels are secured upon the ends of an axle D', mounted to turn in the forward portion of the rear beam section. The forward beam section A, at its forward end, is upwardly curved or inclined, and is provided with a clevis A², pivotally connected therewith, the said clevis being made to extend beyond the forward end of the beam, being widest at its forward end, and at this end the clevis is provided with series of notches or recesses 10.

A shaft 11 is journaled in the opposing ends of the beam sections A and A'. This shaft is removably placed in order that it may be substituted by a seed box and mechanism for driving the same, described in the application for Letters Patent filed by me April 5, 1894, Serial No. 506,480. The shaft 11 has fixed upon it a beveled gear 12, and said gear is made to mesh with a similar gear 13 removably secured to the hub of one of the supporting wheels D, but this gear may be stationarily attached to the hub if in practice it is found desirable. The shaft 11 carries likewise a chopper, and the said chopper consists of a hub 14 secured to the shaft near its forward end, spokes 15 made to radiate from the hub, and hoes 16 located one upon the outer end of each spoke. These hoes are semi-circular or otherwise curved in cross section, and are located at a right angle to the spokes, their concaved surfaces facing forwardly, and the said hoes are preferably made wider at the end adapted to enter the ground than at the opposite end, whereby they are more or less tapering longitudinally, and the leading cutting edge 16ª is likewise preferably tapered more or less transversely.

A support 17 is attached to the rear portion of the forward beam section A. This support, as shown in Fig. 3, is substantially U-shaped in general contour, is removably attached to the under surface of the beam, extends beyond the sides thereof a predetermined distance, and is provided at each extremity with a rearwardly-extending shoe 18. This support 17 serves to regulate the depth at which the hoes will enter the ground, and to that end may be adjustably attached to the beam in any approved manner, a bolt being shown for that purpose in the drawings.

The team is hitched at the extreme left of the clevis, which will throw the animals off from the row and will bring the hoes immediately over the rows. Under this form of the machine it is obvious, as it is drawn forwardly the hoes will be rotated, and will act one after the other to remove the surplus plants from the rows, properly spacing them; and at the same time the blades $B^2$ will cultivate the rows at each side.

Having thus described my invention, I claim as new and desire to secure by Letters Patent—

1. In an agricultural implement, the combination, with a frame comprising a sectional beam, side bars connecting said sections, plow shanks projected rearwardly from the rear end of the rear beam section and adapted to have plows attached thereto, an axle journaled in one of the beam sections, and supporting wheels carried by the axle, of a shaft journaled in the opposing ends of the beam sections, a driving connection between the shaft and the said axle, a support attached to the forward section of the beam and adapted for engagement with the ground, and a rotating hoe secured upon the said shaft, comprising a hub, arms projected therefrom, and blades attached to the said arms, the said blades being curved, their concaved surfaces facing the front, substantially as shown and described.

2. In a cotton chopper, the combination, with a main beam constructed in two sections, a shaft removably journaled between the two sections of the beam, the rear beam section being wheel-supported, arched bars connecting the two beam sections, the rear end of said bars being carried downwardly and forwardly, forming plow shanks, and a gage secured to the forward beam section, of a hoe carried by the said shaft, the said hoe comprising a hub, arms radiating from said hub and hoe blades attached to the outer ends of the arms, the said blades being longitudinally concaved upon one face and convexed upon the other, one end of each blade being also beveled or inclined, and means, substantially as described, for driving the said shaft from the axle of the frame, as and for the purpose specified.

NICHOLAS H. NEWTON.

Witnesses:
TAYLOR RICKETTS,
H. S. GUINN.